United States Patent [19]

Fauss et al.

[11] Patent Number: 4,503,025

[45] Date of Patent: Mar. 5, 1985

[54] PROCESS FOR PREPARING DICYANOGEN

[75] Inventors: Rudolf Fauss, Cologne; Karl-Heinz Linker, Leverkusen; Kurt Findeisen, Odenthal, all of Fed. Rep. of Germany

[73] Assignee: Bayer Aktiengesellschaft, Leverkusen, Fed. Rep. of Germany

[21] Appl. No.: 518,899

[22] Filed: Aug. 1, 1983

[30] Foreign Application Priority Data

Aug. 6, 1982 [DE] Fed. Rep. of Germany ....... 3229415

[51] Int. Cl.$^3$ ................................................ C01C 3/00
[52] U.S. Cl. ..................................... 423/384; 556/477
[58] Field of Search ......................... 423/384; 556/477

[56] References Cited

FOREIGN PATENT DOCUMENTS 3018821 11/1981 Fed. Rep. of Germany .
1318498 1/1963 France .
1556812 12/1968 France .

OTHER PUBLICATIONS

Chemical Abstracts, No. 9, Aug. 27, 1979, vol. 91, 1979.
J. Org. Chem. 1981, 46, 5445–5447, American Chemical Society.
*Chemical Abstracts*, 96(1), 6242j.
*Chemical Abstracts*, 91(9), 74547j.

*Primary Examiner*—John Doll
*Assistant Examiner*—Wayne A. Langel
*Attorney, Agent, or Firm*—Sprung Horn Kramer & Woods

[57] ABSTRACT

Dicyanogen is prepared by reacting trimethylsilyl cyanide with cyanogen halides in the presence of Lewis acids.

13 Claims, No Drawings

PROCESS FOR PREPARING DICYANOGEN

The invention relates to a process for preparing dicyanogen by reacting trimethylsilyl cyanide with a cyanogen halide in the presence of Lewis acids.

Dicyanogen is in itself known and can be prepared, for example, by thermal cleavage of metalcyanides, for example coppercyanide, or by oxidizing hydrocyanic acid in the gas phase (Chem. Rev. 59 (1959)). In general the reactions are carried out at elevated temperatures and/or undesirable by-products are obtained.

A process has been found for preparing dicyanogen, which is characterised in that trimethylsilyl cyanide is reacted with cyanogen halides in the presence of Lewis acids within a temperature range of $-20°$ to $200°$ C.

The process according to the invention can be illustrated by the following reaction equation:

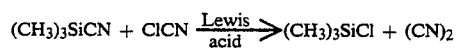

$$(CH_3)_3SiCN + ClCN \xrightarrow{\text{Lewis acid}} (CH_3)_3SiCl + (CN)_2$$

Trimethylsilyl cyanide is in itself known and can be prepared by, for example, reacting sodium cyanide with trimethylsilyl chloride (German Offenlegungsschrift No. 3,018,821).

For the purposes of the invention cyanogen halides are cyanogen chloride, cyanogen bromide and cyanogen iodide.

Cyanogen halides are in themselves known and can be prepared by, for example, halogenating aqueous alkali metal cyanides and drying the resulting product (Ullmann, Encyklopädie der technischen Chemie [Encyclopaedia of Industrial Chemistry], 4th edition, Volume 9, page 669).

In a particular embodiment according to the invention, cyanogen halides are prepared by reacting trimethylsilyl cyanide with halogenating agents within a temperature range of $-20°$ to $200°$ C. Examples of halogenating agents are elemental halogens, such as chlorine, bromine or iodine, mixed halogens, such as chlorine/bromine, bromine/iodine, or chlorine/iodine, and other halogenating agents, such as sulphuryl chloride, sulphuryl bromide, phosphorus pentachloride or phosphorus pentabromide.

In a particularly preferable embodiment according to the invention, the cyanogen halide is prepared in situ. According to the invention, in this case an excess of trimethylsilyl cyanide is reacted with one of the halogenating agents mentioned in the presence of a Lewis acid.

The particular embodiment of the process according to the invention can be illustrated by the following reaction equation:

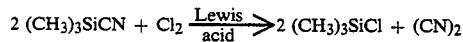

$$2\,(CH_3)_3SiCN + Cl_2 \xrightarrow{\text{Lewis acid}} 2\,(CH_3)_3SiCl + (CN)_2$$

Lewis acids for the process according to the invention do not contain acidic hydrogen. They are described, for example, in Organikum, Org. Chem. Grundpraktikum [Basic Practical Organic Chemistry], 13th edition, 1974, page 347, published by Deutscher Verlag der Wissenschaften. The following compounds may be mentioned as examples of Lewis acids for the process according to the invention: aluminum trichloride, tin dichloride, iron trichloride, zinc chloride, tin tetrachloride, antimony pentachloride, titanium tetrachloride, and boron trifluoride. Particularly preferable Lewis acids are aluminum trichloride, iron trichloride, and/or tin tetrachloride. It is of course also possible to use any desired mixtures of Lewis acids.

The process according to the invention is in general carried out within a temperature range of $-20°$ to $200°$ C., preferably $0°$ to $150°$ C.

The process according to the invention is in general carried out under atmospheric pressure. However, it is also possible to carry out the process according to the invention under a reduced or under a superatmospheric pressure, for example within a pressure range of 0.5 to 10 bar.

In the novel reaction of trimethylsilyl cyanide with cyanogen halides, 0.8 to 2 mols, preferably 1.1 to 0.95 mol, of trimethylsilyl cyanide are in general used per mol of cyanogen halide.

In the novel reaction of trimethylsilyl cyanide with halogenating agents, 1.5 to 3 mols, preferably 1.9 to 2.1 mols, of trimethylsilyl cyanide are in general used per mol of halogenating agent.

The Lewis acid is as a rule used in an amount of 0.01 to 5 parts by weight, preferably 0.1 to 1 part by weight, per 100 parts by weight of trimethylsilyl cyanide.

The process according to the invention is as a rule carried out without a solvent, so that high space/time yields are obtained. However, it is also possible to carry out the process according to the invention in the presence of solvents which are inert to the starting materials and the end products. Examples which may be mentioned of solvents are toluene, xylene, chlorobenzene, o-dichlorobenzene, n-hexane, cyclohexane, and sulpholane. It is of course also possible to use any desired mixtures of the solvents.

The process according to the invention can be carried out, for example, as follows:

Trimethylsilyl cyanide and the Lewis acid are initially introduced, and, starting at room temperature, a cyanogen halide is added dropwise. The reaction solution heats up to the boil and is maintained there. Dicyanogen evolves in the form of a gas, and is condensed in a receiving flask. It is possible to purify further the dicyanogen thus obtained by means of distillation.

In the particularly preferable embodiment of the process according to the invention, namely the reaction of trimethylsilyl cyanide with a halogenating agent, the process according to the invention is in general carried out as follows:

Trimethylsilyl cyanide and the Lewis acid are initially introduced, and, starting at room temperature, the halogenating agent is added. The reaction solution heats up to the boil, and is maintained there. Dicyanogen distils over in the form of a gas, and is condensed in a receiving flask. It is of course also possible in this case to purify further the dicyanogen, by means of distillation, if necessary.

The trimethylsilyl halide obtained in the process according to the invention can be reconverted into trimethylsilyl cyanide in a way which is in itself known (German Offenlegungsschrift No. 3,018,821), and then re-employed in the process according to the invention.

The process according to the invention can be carried out in a discontinuous or continuous manner.

It was unforeseeable that the process according to the invention proceeds within the temperature range according to the invention, since the known dicyanogen syntheses require reaction temperatures of above 200° C. (Chem. Rev. 59 (1959)).

By comparison the process according to the invention is carried out at significantly lower temperatures.

It is an advantage of the process according to the invention that significantly fewer undesirable by-products are formed. The process according to the invention is therefore particularly suitable for preparing dicyanogen.

Dicyanogen is an important intermediate in organic syntheses. It is starting product for the synthesis of oxanide, an excellent nitrogen fertilizer. Dicyanogen may also be used in welding and as rocket propellant (Chemiker Zeitung 96 (7), 388 (1972)).

EXAMPLE 1

204 ml (4 mols) of cyanogen chloride were added dropwise to 396 g (4 mols) of trimethylsilyl cyanide and 1 g of $AlCl_3$. The reaction is exothermic, and reflux is used for 10 minutes towards the end of the reaction. Dicyanogen was distilled off via a condenser kept at $-15°$ C., and was condensed into a receiving flask. A subsequent distillation over a 30 cm packed column produced 140 g of dicyanogen (boiling point: $-20°$ C.), which was positively identified by reacting it with diethylamine to give N,N-diethylcyanoformamidine using the method of H. M. Woodborn et al., J. Org. Chem. 14, 555 (1949).

EXAMPLE 2

Example 1 was repeated, except that 3 g of $FeCl_3$ were used in place of the $AlCl_3$. The reaction proceeded in an analogous manner, except that the reaction time had to be markedly extended.

EXAMPLE 3

297 g (3 mols) of trimethylsilyl cyanide and 2 g of $AlCl_3$ were heated to 60° C., and 106.5 g (1.5 mols) of chlorine were then slowly passed in. Dicyanogen escaped via a condenser maintained at $-15°$ C., and was then condensed into a receiving flask. Towards the end of the reaction the batch was additionally refluxed, for 10 minutes. 299 g of trimethylsilyl chloride were distilled off out of the bottom. The crude dicyanogen was distilled over a 30 cm packed column. Yield: 50 g of dicyanogen.

What is claimed is:

1. A process for preparing dicyanogen which comprises contacting trimethylsilyl cyanide with a cyanogen halide in the presence of a Lewis acid at a temperature of $-20°$ to 200° C.

2. A process according to claim 1, wherein said cyanogen halide is prepared in situ by contacting trimethylsilyl cyanide with a halogenating agent.

3. A process according to claim 2 wherein said trimethylsilyl cyanide is contacted with said halogenating agent in the presence of a Lewis acid.

4. A process according to claim 2, wherein a stoichiometric excess of trimethylsilyl cyanide to an haligenating agent is employed.

5. A process according to claim 1, wherein 0.8 to 2 mols of trimethylsilyl cyanide are employed per mol of cyanogen halide.

6. A process according to claim 1, wherein said Lewis acid is aluminum trichloride, iron trichloride, tin tetrachloride, or a mixture thereof.

7. A process according to claim 1, wherein the process is carried out at a temperature of 0° to 150° C.

8. A process according to claim 1, wherein the Lewis acid is present in an amount of 0.01 to 5 parts by weight per 100 parts by weight of trimethylsilyl cyanide.

9. A process according to claim 1, wherein the process is carried out in the absence of a solvent.

10. A process according to claim 1, wherein 1.1 to 0.95 mols of trimethylsilyl cyanide are employed per mol of cyanogen halide.

11. A process according to claim 1, wherein the Lewis acid is present in an amount of 0.1 to 1 parts by weight per 100 parts by weight of trimethylsilyl cyanide.

12. A process according to claim 1, wherein the trimethylsilyl cyanide and Lewis acid are initially introduced at room temperature, cyanide halide is added and the resultant reaction solution is heated up to boiling to evolve gaseous dicyanogen.

13. A process according to claim 1, wherein said cyanogen halide is selected from the group consisting of cyanogen chloride, cyanogen bromide and cyanogen iodine.

* * * * *